Aug. 16, 1960    G. FRANCE    2,949,577
APPARATUS FOR THE MEASUREMENT OF RESISTORS
Filed March 15, 1957

United States Patent Office 2,949,577
Patented Aug. 16, 1960

2,949,577

APPARATUS FOR THE MEASUREMENT OF RESISTORS

George France, Blyth, Northumberland, England, assignor to Welwyn Canada Limited, London, Ontario, Canada, a corporation of Canada Filed Mar. 15, 1957, Ser. No. 646,236

Claims priority, application Great Britain Mar. 16, 1956

4 Claims. (Cl. 324—62)

This invention relates to apparatus for the measurement of resistors and in particular for use in the measurement of extreme value resistors by means of a circuit arrangement having similarities with the Wheatstone's bridge.

Resistors having values of resistance of from $10^8$ to $10^{13}$ ohms or even higher have been developed and are in general use for example in the field of nuclear investigation where a calibration accuracy of the order of 1% is demanded. It is of course essential that such resistors should be stable.

A number of methods have been used for the measurement of such resistors, one of which is the classic method of measuring the time constant of a circuit comprising the resistor to be measured and a capacitor of known capacitance. While this method may, with certain precautions, be very accurate, it is necessary, in practice, for the duration of the measurement to exceed 100 seconds for this accuracy to be achieved, thus, it is not very convenient as a production process. Other methods have been used which involve applying the resistor to a circuit, but, in many cases, such methods have the disadvantage that the circuit contains capacity which is not negligible, so that the resistor and its residual capacity have a time constant which is not, by any means, negligible. As a result the measurement can proceed no faster than the change of voltage across this combination, and, again, the measurement takes a long time and, thus, is unacceptable for production purposes.

The application of the Wheatstone's bridge method of comparing resistors which gives accurate measurement for normal values of resistance, has been found difficult because:

(a) Either a very high ratio must be used and the sensitivity of the bridge is consequently very low, and if a high ratio is used the balance must be obtained by using an extremely low value of fixed resistor in one ratio arm as there is clearly a limit to the maximum value of decade resistance which it is convenient to use. If a low ratio is used then the resistor in series with the unknown must have a value which is too high for a good stability.

(b) Either the supply to the bridge or the detector input circuit must be of the balanced type and this introduces the almost insuperable difficulty of designing the supply or detector to have an insulation to earth of $10^{16}$ ohms.

(c) The detector input resistance must be very high, in order that reasonable sensitivity be obtained, and, as the input capacitance of the detector cannot be negligible, the detector will have an appreciable time constant. This time constant will have the effect of making the act of balancing the bridge tedious because all variations in the signal to be detected, produced by the balancing procedure, are subject to the time constant of the detector input circuit.

One of the objects of the present invention is to provide an improved method of and apparatus for measuring multi-megohm resistors which will overcome some or all of the above disadvantages.

According to the present invention the method of measuring a resistor of extreme value by comparison with a resistor of known moderate value consists in connecting the two resistors in series with a source of known constant voltage and comparing, with the use of a voltage amplifier of low impedance output and a bridge or quasi bridge, the voltage across the terminals of said known resistor with the voltage across another known resistor of moderate value itself in series with a second known resistor also of moderate value and a source of known constant voltage. The ratio of the convertor may be such as to make the compared voltages nearly equal. The ratio of the voltage convertor may be equal to the ratio between the voltages of the said constant supplies.

According to a further feature of the invention the method of measuring a high resistance resistor which consists in placing it in series with a standard resistor across a constant voltage source, amplifying the voltage appearing across the standard resistor and converting it to a low impedance and comparing it with the voltage which appears across a corresponding resistor of a pair of resistors of relatively low value also in series across a constant voltage source. Said amplifier may have a gain equal to the ratio of the second to the first constant voltage sources.

According to the present invention apparatus for measuring a high resistance resistor comprises a circuit wherein the resistor to be measured is compared with a standard resistor of very much lower value and an amplifier, of very high input resistance compared with the standard resistor used, and low output resistance, is interposed between this high resistance pair and the galvanometer measuring instrument and another corresponding but relatively low resistance pair of resistors.

The two pairs of resistors of the apparatus may each be supplied by separate constant voltage sources or alternatively one source with a voltage divider to give two voltages. The amplifier must have a high input resistance and a low output resistance and high stability. To obtain the greatest simplicity the gain of the amplifier should be substantially equal to the ratio of the second voltage to the first. It is also obvious that the standard resistor used in the high resistance arm should not be of such a high value that complications due to any instability and inaccuracy thereof are introduced. Considerable negative feed back may be used in the amplifier to achive a sufficient stability and linearity of the amplifier to meet practical requirements.

The present invention will now be described with reference to the accompanying drawing in which:

Fig. 1 is a circuit diagram of one form of the apparatus for the measurement of high values of resistance.

With references to Fig. 1, a D.C. amplifier 1 having a high input resistance and a low output resistance is connected in series with a galvanometer 2 across the high resistance pair 3 and low resistance pair 4. The high resistance pair 3 comprises the standard resistor $R_s$ and the resistor $R_x$, whose value is to be determined. A constant voltage source $E_1$ is connected across the high resistance pair 3. The pair 4 comprises a resistor $R_2$ and a variable resistor $R_3$, connected in series, across which a constant voltage source $E_2$ is applied. The D.C. amplifier 1 has its input connected to the middle point of the high resistance pair 3, and its output connected to the galvanometer 2.

When no current flows through the galvanometer 2, it follows that $E_{out} = E_{R2}$. Under these conditions the value of the unknown resistor $R_x$ can be determined from the following formula:

$$R_x = R_s \left( \left( \frac{AE_1}{E_2} \right) \left( 1 + \frac{R_3}{R_2} \right) - 1 \right) \quad (1)$$

where A is the gain of the amplifier.
If the term $$\left( \frac{AE_1}{E_2} \right)$$

is made equal to unity Formula 1 becomes $$R_x = R_s \times \frac{R_3}{R_2}$$

which is the familiar Wheatstone's bridge formula. For this reason it is convenient under these conditions to refer to the apparatus as a bridge though such a description is not strictly accurate as there are two polarising voltages applied to the apparatus.

The stability of the circuit above described is dependent upon the stability of the amplifier as well as the ratio of the constant reference voltages $E_2/E_1$. Thus in order to obtain an accurate determination of the value of $R_x$ it is essential that the D.C. amplifier should have a high percentage of negative feedback. In addition to avoid any shunting effect on $R_s$ it is essential that the apparatus should have a high input resistance. A vibrating capacitor type of amplifier is suitable since it has a good gain stability and high input resistance.

Greater accuracy can be obtained if the standard resistor $R_s$ is made small compared with $R_x$, since the error due to the voltage coefficient of the standard resistor $R_s$ will be negligibly small if the greater part of the reference voltage $E_1$ is developed across $R_x$. In practice it is possible to obtain resistors of sufficient stability and reliability up to $10^{11}$ ohms, and assuming that $R_x$ can be made approximately equal to $100\ R_s$, it is possible to measure $R_x$ up to $10^{13}$ ohms.

Thus by using the circuit above described with $R_s = 10^{11}$ ohms and $R_x =$ not less than $100\ R_s$ the value of $R_x$ which may be measured on the highest range is not less than $10^{13}$ ohms. If each range is to cover one decade of resistance, the maximum value which can be measured on this range is $10^{14}$ ohms.

The relation that $$A = \frac{E_2}{E_1}$$

is made variable thus providing the facility of different test voltages with a constant bridge sensitivity. If $E_2$ is fixed at as a high value as is convenient, in order to obtain high sensitivity, then it is only necessary to adjust the gain A as the test voltage is changed and the sensitivity is unaltered. This facility enables the voltage coefficient of $R_x$ to be determined accurately.

In order that measurements of different resistors may be accurately compared, all measurements, except those involved in the determination of voltage coefficient and other special requirements, are carried out at a test voltage of 10 v. It is evident that the amplifier input signal will be between 10 and 100 mv. on any one range of the instrument. The input resistance required is not less than 100 times the maximum value of the standard resistor which is used, i.e. not less than 100 times the maximum value of the standard resistor which is used, i.e. not less than $10^{13}$ ohms. The drift of zero level, characteristic of all D.C. amplifiers, must be less than 100 microvolts over a period of an hour or more in order that the drift signal shall not introduce an error of more than 1% into the measurement. Operation of the instrument by unskilled personnel makes it advisable to avoid the necessity for repeated adjustments.

The electrometer amplifier shown in the circuit is, in a preferred embodiment of the invention, a vibrating capacitor type of amplifier, since this gives good stability of gain with high resistance. On the other hand, this is not an essential feature of the invention, since other electrometer D.C. amplifiers are available, and, with appropriate design, can be satisfactory.

It will thus be appreciated that the normal Wheatstone's bridge circuit has been modified, splitting the two ratio arms and feeding them with their separate D.C. supplies. The galvanometer is connected in the normal position of the detector, but is fed from the high resistance ratio arm with an amplifier in which the gain is equal to the ratio of the two polarising voltages used for the bridge.

Naturally, the galvanometer can be an indicating instrument appropriate to the output of the amplifier, and, since the output resistance of such an amplifier can be made is low as desired, the galvanometer can be be a robust instrument. This is a considerable advantage, since a high resistance galvanometer is fragile and, in any case, no galvanometer is practicable which would have resistance which is in any way suitable for the operation of a conventional bridge for operation at such high resistances without the modifications shown.

It is not essential that the gain of the amplifier should be equal to the ratio of the two reference voltages. The advantage of making it so lies in the simplicity of the relationship between the four elements of the network. If the rule is not observed it is still possible to use the apparatus as intended, but it would not be direct reading, it would then be necessary to compute the value of the resistor to be measured in terms of the polarising voltages, the gain of the amplifier and the values of the three known resistors. This may be cumbersome but it is practicable.

Figure 1:
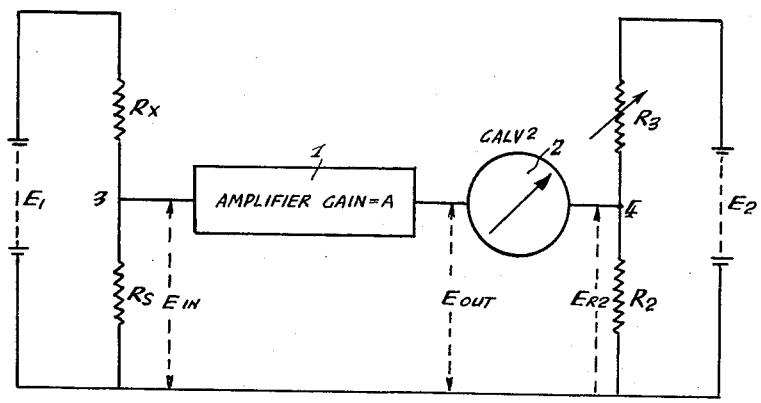
Figure 2:
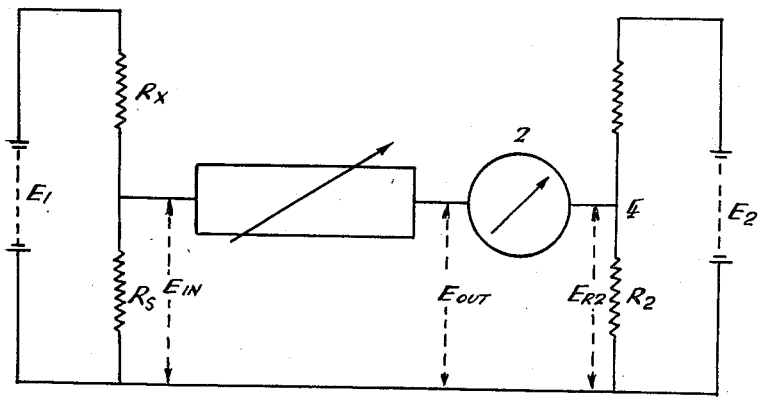
Fig. 2 shows a modified circuit wherein a fixed resistor is substituted for the variable resistor and the gain of the voltage amplifier is made variable.
Figure 3:
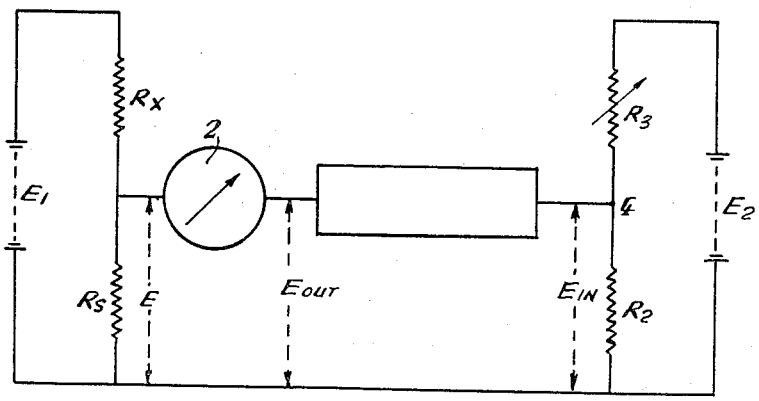
Fig. 3 shows a further modified circuit wherein the voltage amplifier is positioned on the other side of the galvanometer.

What I claim and desire to secure by Letters Patent is:

1. Apparatus for measuring the ohmic resistance of a high-resistance resistor comprising in combination a first voltage source of known magnitude, a first standard resistor of known ohmic value much less than that of the resistor to be measured, circuit means connecting said resistors in series across said voltage source, a second voltage source of known magnitude substantially greater than that of said first voltage source, second and third standard resistors of known magnitude connected in series across said second voltage source, a stable voltage amplifier having gain substantially equal to the voltage ratio of said first and second voltage sources and having a pair of high-impedance input terminals and a pair of lower-impedance output terminals, said input terminals being connected across said first standard resistor, and additional circuit means comprising a current indicator connecting said output terminals across one of said other standard resistors.

2. Apparatus for measuring the ohmic resistance of a high-resistance resistor comprising in combination a first voltage source of known magnitude, a first standard resistor of known ohmic value much less than that of the resistor to be measured, circuit means connecting said resistors in series across said voltage source, a second voltage source of known magnitude substantially greater than that of said first voltage source, second and third standard resistors of known magnitude connected in series across said second voltage source, a stable voltage amplifier having voltage gain substantially equal to the voltage ratio of said second source and said first source, said amplifier having a pair of high-impedance input terminals and a pair of lower-impedance output terminals, second circuit means connecting said input terminals of said amplifier across the first of said standard resistors, and third circuit means comprising a current indicator connecting said output terminals across another one of said standard resistors, one of the two last-mentioned standard resistors being said first standard resistor.

3. Apparatus for measuring the ohmic resistance of a high-resistance resistor comprising in combination a first voltage source of known magnitude, a first standard resistor of known ohmic value much less than that of the resistor to be measured, circuit means connecting said resistors in series across said voltage source, a second voltage source of known magnitude substantially greater than that of said first voltage source, second and third standard resistors of known magnitude connected in series across said second voltage source, one of said second and third standard resistors being a calibrated variable resistor, a stable voltage amplifier having a voltage gain substantially equal to the voltage ratio of said second and first voltage sources and having a pair of high-impedance input terminals and a pair of lower-impedance output terminals, second circuit means connecting said input terminals of said amplifier across said first standard resistor, and third circuit means comprising a current indicator connecting said output terminals across one of said second and third standard resistors.

4. The apparatus defined in claim 3 wherein said second standard resistor is the variable calibrated resistor therein mentioned and wherein said third circuit means connects the output terminals of said amplifier across said third standard resistor.

References Cited in the file of this patent

UNITED STATES PATENTS

| | | |
|---|---|---|
| 1,964,141 | Rhodes et al. | June 26, 1934 |
| 2,360,523 | Simmons | Oct. 17, 1944 |
| 2,461,923 | Razek | Feb. 15, 1949 |
| 2,558,445 | Fritzinger | July 3, 1951 |
| 2,767,974 | Ballard et al. | Oct. 23, 1956 |
| 2,803,799 | Siegel | Aug. 20, 1957 |